United States Patent
Renault et al.

(10) Patent No.: US 6,682,676 B1
(45) Date of Patent: Jan. 27, 2004

(54) METHOD FOR MOLDING A THERMOPLASTIC SANDWICH MATERIAL

(75) Inventors: Thierry Renault, Vernon (FR); Francis Vendangeot, Chateaubriant (FR); Jacques Heinry, Pouance (FR)

(73) Assignee: Patent Holding Company, Fraser, MI (US)

( * ) Notice: Subject to any disclaimer, the term of this patent is extended or adjusted under 35 U.S.C. 154(b) by 0 days.

(21) Appl. No.: 09/525,785

(22) Filed: Mar. 15, 2000

(51) Int. Cl.⁷ .............................................. B29C 51/08
(52) U.S. Cl. ...................... 264/161; 264/257; 264/263; 264/266; 264/275; 264/322; 264/324; 264/325; 156/245
(58) Field of Search ................................. 264/138, 162, 264/163, 275, 263, 322, 325, 299, 257, 324, 266; 156/245

(56) References Cited

U.S. PATENT DOCUMENTS

| | | | | |
|---|---|---|---|---|
| 3,709,968 A | * | 1/1973 | Houghton | 264/550 |
| 4,088,718 A | * | 5/1978 | Mulvany, Jr. | 264/25 |
| 4,315,050 A | * | 2/1982 | Rourke | 428/116 |
| 4,619,806 A | * | 10/1986 | Gunn | 264/522 |
| 4,702,688 A | * | 10/1987 | Schenk | 425/450.1 |
| 4,917,747 A | * | 4/1990 | Chin et al. | 156/198 |
| 5,199,595 A | * | 4/1993 | Muggli et al. | 220/62.11 |
| 5,217,563 A | * | 6/1993 | Niebling et al. | 156/382 |
| 5,876,654 A | * | 3/1999 | Blonigen et al. | 264/316 |

FOREIGN PATENT DOCUMENTS

| | | | |
|---|---|---|---|
| DE | 1 299 853 | * | 7/1969 |
| DE | 26 36 463 A1 | * | 2/1978 |
| DE | 197 41 917 A1 | * | 3/1999 |
| EP | 0 649 736 B1 | | 4/1995 |
| EP | 0 855 309 A1 | * | 7/1998 |
| EP | 894611 A1 | | 2/1999 |
| EP | 0 903 216 A2 | * | 3/1999 |
| FR | 2 763 881 | * | 12/1998 |
| JP | 08-112856 | * | 5/1996 |
| WO | WO 98/04398 | * | 2/1998 |

OTHER PUBLICATIONS

U. Breuer, et al., Deep Drawing of Fabric–Reinforced Thermoplastics: Wrinkle Formation and Their Reduction, Polymer Composites, Aug. 1996, vol. 17, No. 4.

* cited by examiner

Primary Examiner—Stefan Staicovici
(74) Attorney, Agent, or Firm—Brooks Kushman P.C.

(57) ABSTRACT

A method and system for molding thermoplastic sandwich material to form a deep-drawn article utilizing a unique clamping technique and mechanism are described. The method includes the steps of positioning a blank of thermoplastic sandwich material having a cellular core over a female die having an article-defining cavity defined by inner surfaces of the female die. Then, an inner portion of the blank is forced into the female die along a substantially vertical axis and against the inner surfaces of the female die to obtain deep-drawn material. During the step of forcing at least one outer portion of the blank immediately adjacent the female die is clamped to guide the at least one outer portion of the blank to travel into the article-defining cavity at an acute angle with respect to the vertical axis. Thickness of at least one side wall of the deep-drawn material is substantially the same as thickness of the blank of thermoplastic sandwich material. The deep-drawn material does not significantly stretch or tear during the step of forcing due to the clamping technique and mechanism.

7 Claims, 4 Drawing Sheets

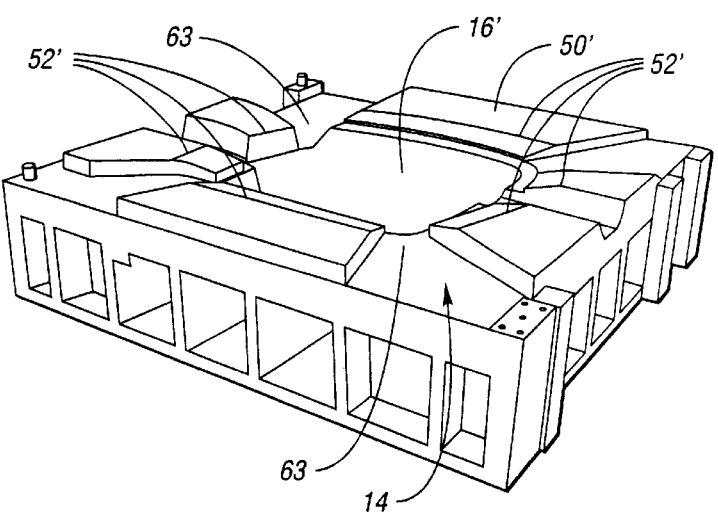
_Fig. 6_
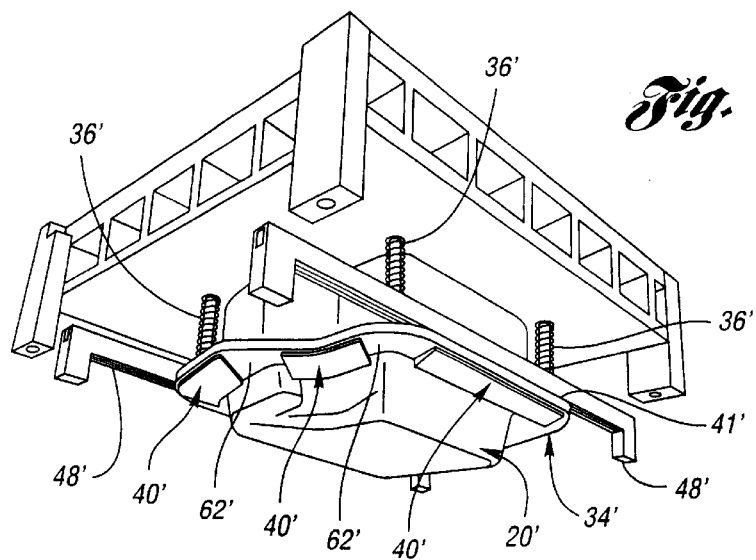
_Fig. 7_
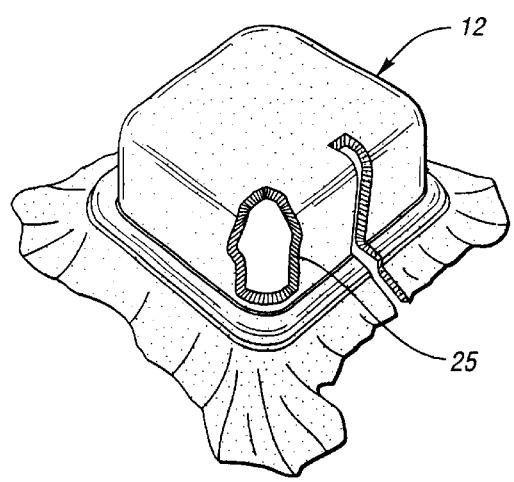
_Fig. 8_

METHOD FOR MOLDING A THERMOPLASTIC SANDWICH MATERIAL

CROSS-REFERENCE TO RELATED APPLICATION

This application is related to U.S. patent application entitled "Method And System For Co-Molding Thermoplastic Material With A Thermoplastic Sandwich Material And Article Produced Thereby" filed on the same date as this application, having a common assignee, and having U.S. Ser. No. 09/525,346.

TECHNICAL FIELD

This invention relates to methods and systems for molding thermoplastic sandwich material and deep-drawn articles produced by such methods and systems.

BACKGROUND ART

Thermoplastic Sandwich Materials

The stiffness of thermoplastic sandwich materials is due to the distance between its two skins that gives a high moment of inertia to the part. It is therefore important to preserve the distance between the skins during the molding of the sandwich part in order to obtain the full stiffness potential of the part. Any reduction of thickness causes a reduction of stiffness.

During the conception of a sandwich part with a cellular core, it is sometimes necessary to reduce the thickness of the part locally in order to obtain a specific shape. The stiffness in that area will be reduced but can be maintained by the part geometry. An example is that of a suitcase corner that gives the stiffness to the suitcase even though the part thickness is uniform.

Thermoplastic sandwich materials are traditionally used as flat panels or shaped parts for the following applications:

|  | Flat Panels Industrial Vehicles Building Construction | Shaped Parts Air and Space, Boats Trains |
| --- | --- | --- |
| Materials | All | Thermosets |
| Formability | -- | ++ |
| Volumes | + | − |
| Cost | ++ | -- |
| Aspect | + | + |

Currently, the market for sandwich materials is:
  Competitive cost for flat panels,
  Very high cost and low volume for shaped sandwich parts limits market to high technology applications and not high volume parts such as automotive parts.
Deep-draw Stamping of Steel Sheets A stamped steel part is deep drawn wherein the depth of the part is typically more than one hundred times its thickness. Deep-draw of steel is possible because of its ductility.

Technical solutions were developed such as the use in the mold of a blank holder at the periphery of the stamping area that allows the part to be deformed under a high pressure without any folds. Folding the excess material of the sheet rather than stretching it is avoided because the created folds are brittle in fatigue and aging.

The pressure of the blank holder is a function of:
  Initial blank diameter and its thickness after stamping;
  Tensile strength of the steel;
  Diameter of the stamping mold; and
  An empirical parameter, n, that is a function of the ratio of blank diameter to stamping die diameter.

Stamping of a Cylindrical Steel Part

To manufacture cylindrical parts starting from a steel blank, it is possible to obtain a part with a maximum depth that is equal to seven times its diameter but six successive stampings are needed.

As an example, to obtain a cylindrical part with a diameter of 100 mm and a depth of 700 mm, eight stages are required as follows:

1. Cut a circular blank of 538 mm diameter;
2. Stamp to obtain a part with a 325 mm diameter and a depth of 145 mm;
3. Stamp to obtain a part with a 240 mm diameter and a depth of 240 mm;
4. Stamp to obtain a part with a 194 mm diameter and a depth of 325 mm;
5. Stamp to obtain a part with a 155 mm diameter and a depth of 428 mm;
6. Heat treat the part;
7. Stamp to obtain a part with a 124 mm diameter and a depth of 553 mm; and
8. Stamp to obtain a part with a 100 mm diameter and a depth of 700 mm.

After the fifth stage it is necessary to heat treat the part to regenerate the metal.

Stamping of a Part With Four Corners

The technique is similar to that used for cylinders except for the shape of the initial blank to avoid too much material loss after stamping. To define the development of the corners and of the walls, curves based on experience exist to define the depth and the radius.

Stamping of Sandwich Steel Blanks

Sandwich steel blanks are made of a sandwich with thin skin layers with a core. The blanks can be stamped.

Processing of Flat Thermoplastic Sandwich Materials

European Patent EP 0 649 736 B1 explains the principle of the sandwich technique for forming substantially flat parts. The part is made in a single stage by pressing in a cold mold, at a pressure in the range of 10 bars to 30 bars, a stack consisting of at least a first outer skin layer of stampable reinforced thermoplastics material, a cellular core of thermoplastics material, a second outer skin layer of stampable reinforced thermoplastics material. The axes of the cells of the cellular core are generally oriented perpendicular to the skin layer. The skin layers and core are previously heated outside the mold to a softening temperature.

European patent application 894611 A1 describes a 2D deep-draw which utilizes an element such as a piece of EPP foam to make sure that a skin is not in contact with a core during heating. When the blank is stamped, the tension on the skin is such that it does not crush the core during forming.

Shaping of Sandwich Material by 3D Deep-draw Solutions Used for Sandwich Material in the Aeronautics Industry These solutions consist in erasing the problems due to:
  The high stiffness of the skins in elongation,
  Low compression strength of the core as compared to the tensile strength.

Therefore, to form a corner in a sandwich part, Hexcel Composites Company cuts the skin, and adds epoxy adhesive to fill the honeycomb.

If the corner will be exposed to high stress, the solution in the aeronautics industry is:

either the corner is reinforced with an angled insert(s) that is glued, or the corner is reinforced with a metallic insert (extruded) with which two sandwich panels are assembled (glued).

Deep-drawing of Fabric-Reinforced Thermoplastics

Some experimental work has been done at the German Institute IVW (Kaiserslautern Germany) on the deep-drawing of fabric reinforced thermoplastics. A summary of that work is presented in the journal POLYMER COMPOSITES, August 1996, Vol. 17, No. 4, p. 643–647 by Breuer, Neitzel, Ketzer and Reinicke. They explain that for stamp forming of fabric-reinforced sheet material into simple 3D parts ordinary planar blank holders have proved to be sufficient to avoid any wrinkling. However, to stamp more complex shaped and large parts, this technique is limited. In this case, different clamping forces are needed on different areas of the blank. They propose a flexible roller-tracking device where the sheet material is drawn into the mold between two knurled rollers. With this system, different tension forces can be applied at selected zones of the sheet.

DISCLOSURE OF INVENTION

An object of the present invention is to provide a method and system for molding thermoplastic sandwich material and a deep-drawn article produced thereby wherein the thickness of at least one side wall of the deep-drawn article is substantially the same as the original thickness of a blank of the thermoplastic sandwich material.

Another object of the present invention is to provide a method and system for molding thermoplastic sandwich material and a deep-drawn article produced thereby wherein the articles are produced at a relatively low cost and high volume (i.e. low cycle time) by utilizing a single stamping step.

In carrying out the above objects and other objects of the present invention, a method is provided for molding thermoplastic sandwich material to form a deep-drawn article. The method includes positioning a blank of thermoplastic sandwich material having a cellular core over a female die having an article-defining cavity defined by inner surfaces of the female die. The method also includes forcing an inner portion of the blank into the female die along a substantially vertical axis and against the inner surfaces of the female die to obtain deep-drawn material. The method further includes clamping at least one outer portion of the blank immediately adjacent the female die to guide the at least one outer portion of the blank to travel into the article-defining cavity at an acute angle with respect to the vertical axis during the step of forcing so that thickness of at least one side wall of the deep-drawn material is substantially the same as thickness of the blank of thermoplastic sandwich material and so that the deep-drawn material does not significantly stretch or tear during the step of forcing. The method still further includes removing the deep-drawn material from the female die, and removing any excess material from the periphery of the deep-drawn material to form the deep-drawn article.

Preferably, the step of forcing includes the step of stamping and the step of clamping is performed with a clamping force which increases during the step of forcing.

The step of clamping may be performed at a plurality of spaced outer portions of the blank immediately adjacent the female die. Preferably, the step of clamping is performed at the plurality of spaced outer portions by a clamp assembly and a counter clamp assembly and wherein the method further includes maintaining a substantially constant distance between the assemblies during the step of forcing.

Preferably, each of the assemblies includes a plurality of spaced elongated clamping surfaces for clamping the plurality of spaced outer portions of the blank wherein each elongated clamping surface is inclined at the acute angle with respect to the vertical axis.

Preferably, the step of forcing is performed in a single stamping stage.

The inner surfaces of the female die may define a plurality of corners which correspond to spaces between the plurality of spaced outer portions wherein the spaces are sized to permit thermoplastic sandwich material of the blank to move therein during the step of forcing.

Further in carrying out the above objects and other objects of the present invention, a system is provided for molding thermoplastic sandwich material to form a deep-drawn article. The system includes a female die having an article-defining cavity defined by inner surfaces of the female die and a male die for forcing an inner portion of a blank of thermoplastic sandwich material having a cellular core into the female die along a substantially vertical axis and against the inner surfaces of the female die to obtain deep-drawn material. The system also includes a clamping mechanism for clamping at least one outer portion of the blank immediately adjacent the female die to guide the at least one outer portion of the blank to travel into the article-defining cavity at an acute angle with respect to the vertical axis during forcing of the inner portion of the blank into the female die so that thickness of at least one side wall of the deep-drawn material is substantially the same as thickness of the blank of thermoplastic sandwich material and so that the deep-drawn material does not significantly stretch or tear as the inner portion of the blank is forced into the female die.

The system preferably further includes a stamping press for forcing the male die into the female die.

Preferably, the clamping mechanism is spring-loaded so that the clamping mechanism exerts a clamping force at the at least one outer portion of the blank. The clamping force increases as the inner portion of the blank is forced into the female die.

The clamping mechanism preferably includes a clamping assembly mounted to move with the male die which has at least one spring which compresses as the inner portion of the blank is forced into the female die.

Preferably, the clamping mechanism includes a clamping assembly and a counter clamping assembly for clamping a plurality of spaced outer portions of the blank immediately adjacent the female die. A substantially constant distance is maintained between the clamping assembly and the counter clamping assembly as the inner portion of the blank is forced into the female die.

Each of the assemblies preferably includes a plurality of elongated clamping surfaces for clamping the plurality of spaced outer portions of the blank. Each elongated clamping surface is inclined at the acute angle with respect to the vertical axis.

The inner surfaces of the female die may define a plurality of corners which correspond to spaces between the plurality of spaced outer portions. The spaces are sized to permit thermoplastic sandwich material of the blank to move therein as the inner portion of the blank is forced into the female die.

Still further in carrying out the above objects and other objects of the present invention, a deep-drawn article formed by the steps of the method is provided.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIGS. 3–5 are side views of the system, wherein FIG. 3 shows male and female dies fully spaced apart; FIG. 4 shows the dies closer together; and FIG. 5 shows the dies closed together wherein a blank of thermoplastic sandwich material is not shown for the sake of simplicity;

FIG. 6 is a top perspective view of another female die and counter clamp assembly of the present invention;

FIG. 7 is a bottom perspective view of another male die and clamp assembly of the present invention; and FIG. 8 is a top perspective view, partially broken away and in cross-section, of an article in the form of a tub constructed in accordance with the present invention and illustrating a substantially constant thickness of the side walls of the tub.

BEST MODE FOR CARRYING OUT THE INVENTION

In general, the invention deals with the development of a new method and system to form thermoplastic sandwich parts or articles with a 3D deep-draw while preserving the constant thickness of the blank of thermoplastic sandwich material. The sandwich is made of two outer reinforced thermoplastic skins with a cellular core at the center and is molded by a thermocompression process, as generally described in U.S. Pat. No. 5,683,782. The skins may be polypropylene with continuous glass mats or woven glass with polypropylene fibers. The method and system of the invention allows one to mold thermoplastic sandwich parts with a deep-draw and with a cost and a cycle time that can be used for automotive and other high volume applications.

The technique of the present invention is somewhat similar to that used for steel stamping. However, the method of the present invention requires only a single stamping step.

The thermoplastic sandwich material used in the method and apparatus is not ductile but brittle and it is not possible to stretch the skin of the material plastically to form the part.

Figure 1:
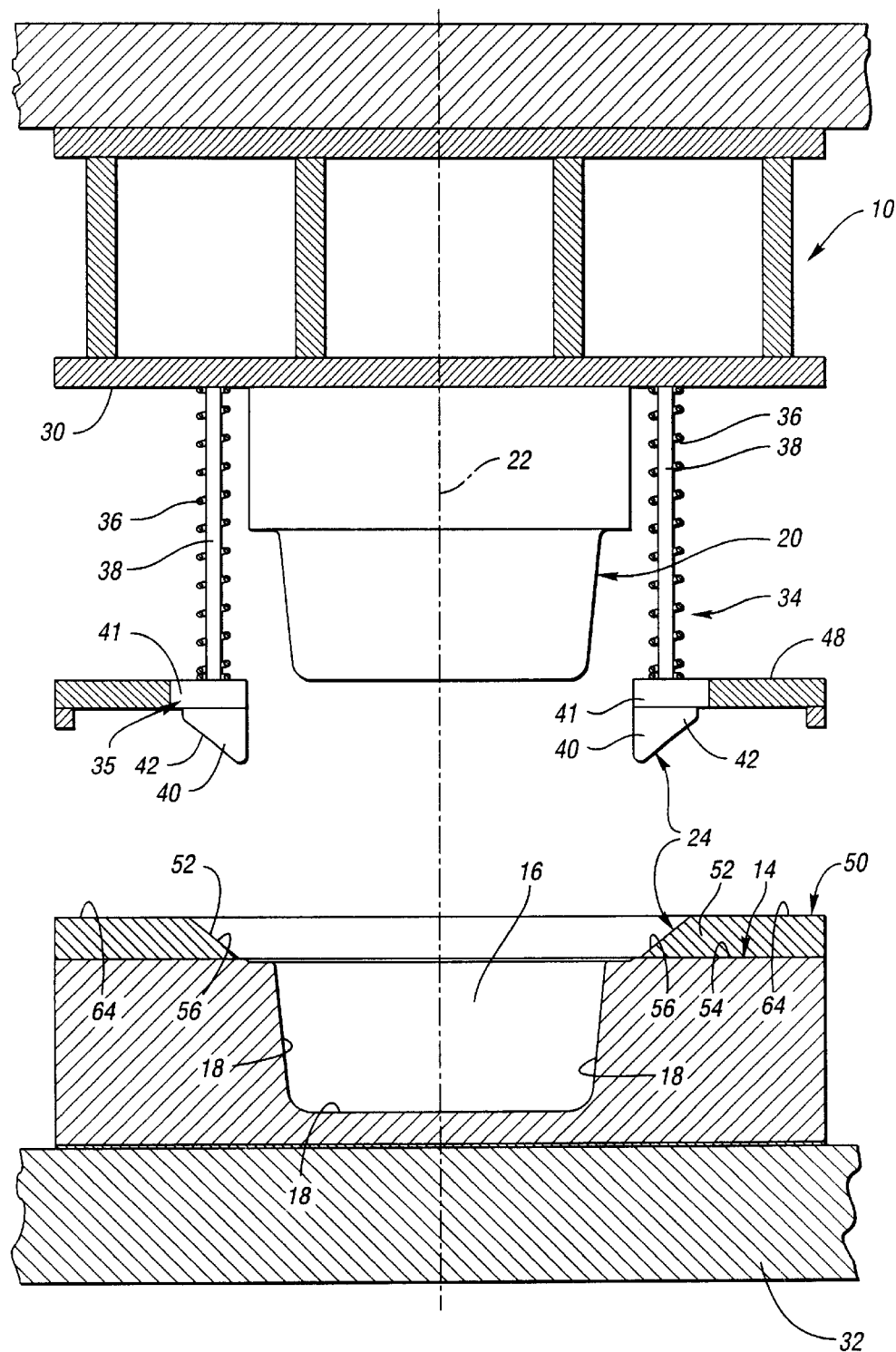
FIG. 1 is a side view, partially broken away and in cross-section, of a system for making a deep-drawn thermoplastic sandwich article of the present invention.

Referring now to FIG. 1, there is illustrated a system, generally indicated at 10, for making a deep-drawn thermoplastic sandwich article such as a tub, generally indicated at 12 in FIG. 8. The system includes a female die, generally indicated at 14, having an article-defining cavity 16 defined by inner surfaces 18 of the female die 14. The female die is positioned on a lower base member 32 of a press.

The system 10 also includes a male die, generally indicated at 20, mounted on a movable member 30 of the press for forcing an inner portion of a blank of thermoplastic sandwich material having a cellular core into the female die 14 along a substantially vertical axis 22 and against the inner surfaces 18 of the female die 14 to obtain deep-drawn material. The stamping press including the upper movable member 30 forces the male die 20 into the female die 14 which is supported on the lower base member 32 of the stamping press.

The system 10 also includes a clamping mechanism, generally indicated at 24, for clamping at least one outer portion of the blank immediately adjacent the female die 14 to guide the at least one outer portion of the blank to travel into the article-defining cavity 16 at an acute angle with respect to the vertical axis 22 during forcing of the inner portion of the blank into the female die 14 so that thickness of at least one side wall 25 of the deep-drawn material is substantially the same as thickness of the blank of thermoplastic sandwich material (as shown in FIG. 8) and so that the deep-drawn material does not significantly stretch or tear as the inner portion of the blank is forced into the female die 14. The clamping mechanism 24 only slightly compresses the blank of material so that it does not stretch or tear the blank during stamping.

The clamping mechanism 24 is spring-loaded by springs 36 so that the clamping mechanism 24 exerts a clamping force at a plurality of spaced outer portions of the blank. The clamping force increases as the inner portion of the blank is forced into the female die 14 by the male die 20.

The clamping mechanism 24 includes a clamping assembly, generally indicated at 34, mounted on the member 30 to move with the male die 20. The clamping assembly 34 includes a clamp, generally indicated at 35 in FIG. 2, supported by rods 38 which are slidably secured within the member 30. The clamping assembly 34 also includes the springs 36 positioned about their respective rods 38. The springs 36 compresses as the inner portion of the blank is forced into the female die 14 by movement of the male die 20 into the article-defining cavity 18 of the female die 14. At the same time, the rods 38 slide into the upper movable member 30.

Figure 2:
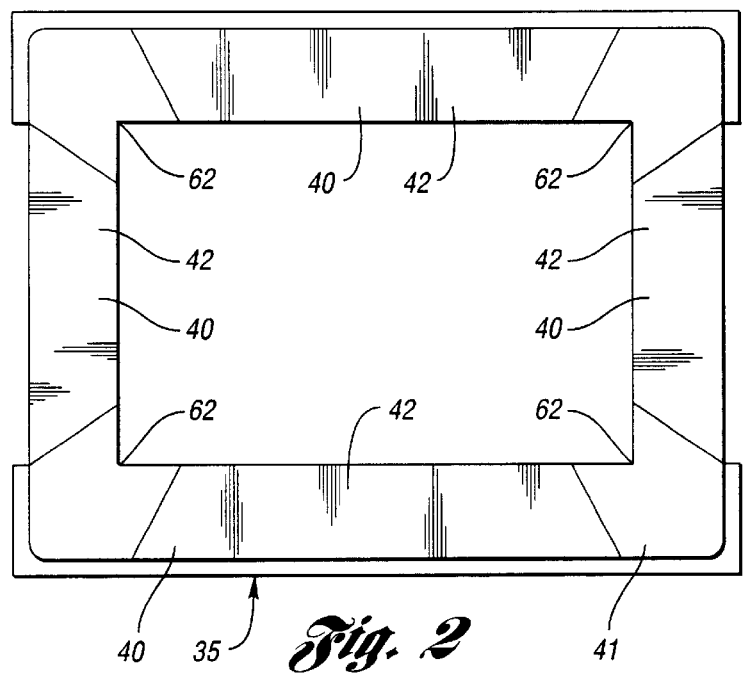
FIG. 2 is a bottom view of a clamping assembly of a clamping mechanism of the present invention.
Figure 3:
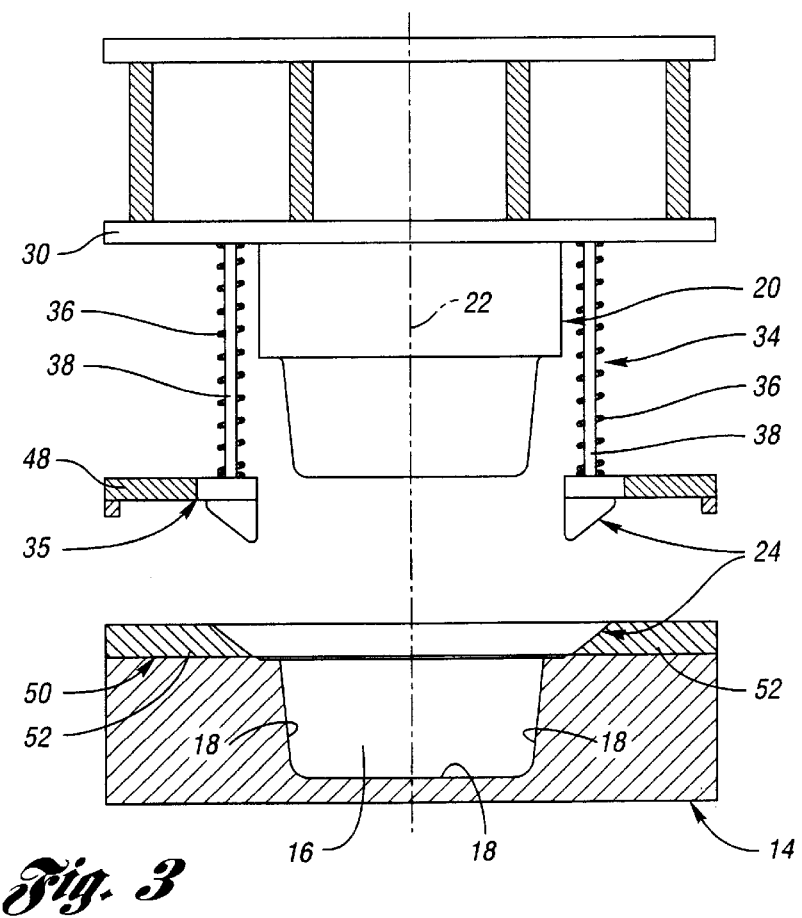
Figure 4:
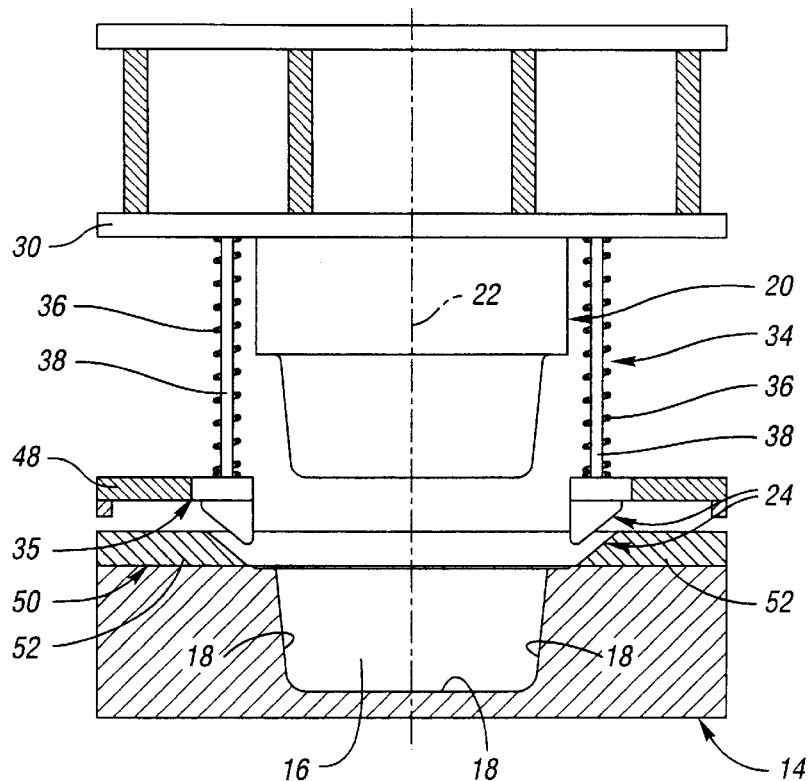

As shown in FIGS. 1 and 2, the clamp 35 includes a plurality of spaced, wedge-shaped, elongated blocks 40 mounted on a frame member 41 of the clamp 35. Each of blocks 40 includes an inclined clamping surface 42 which engages an upper surface of the blank of material during the deep-drawing process. A stop mechanism 48 (not shown in FIG. 2) is mounted on the frame member 41 to control the thickness of the resulting article.

Figure 5:
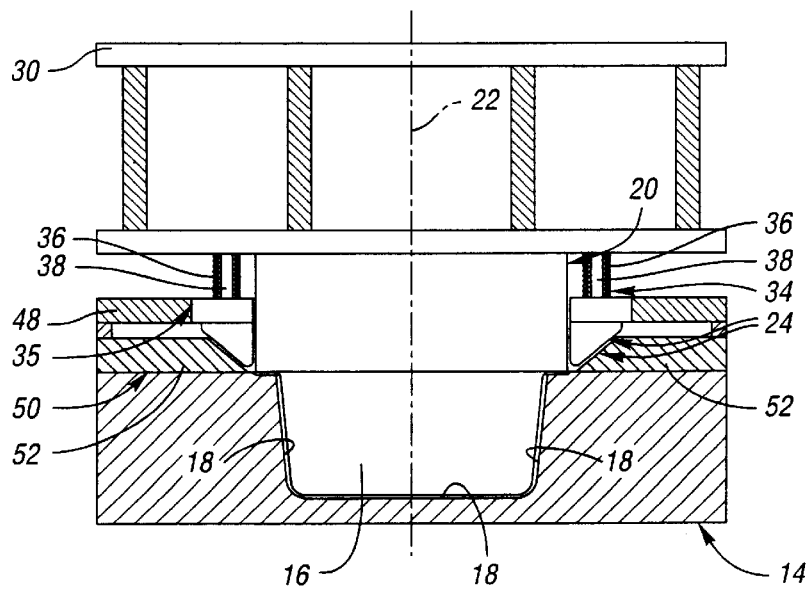

The clamping mechanism 24 also includes a counter clamping assembly, generally indicated at 50, which together with the clamping assembly 34 clamps the blank at a plurality of spaced outer portions immediately adjacent the female die 14. A substantially constant distance, as indicated in FIG. 5, is maintained between the clamping assembly 34 and the counter clamping assembly 50 as the inner portion of the blank is forced into the female die 14.

The counter clamping assembly 50 also includes a plurality of spaced wedge-shaped blocks 52 mounted on an upper surface 54 of the female die 14. Each of the blocks 52 includes an elongated clamping surface 56 for clamping the plurality of spaced outer portions of the blank against the surfaces 42 of the blocks 40. All of the elongated clamping surfaces 42 and 45 are inclined at the acute angle with respect to the vertical axis 22.

The side surfaces 18 and a bottom surface 18 of the female die 14 define a plurality of lower corners which correspond to spaces between the plurality of spaced outer portions of the blank and spaces 62 between the blocks 40 of the clamp 35 as best shown in FIG. 2. The spaces 62 also correspond to spaces between the blocks 52 of the counter clamping assembly 50 and are sized to permit thermoplastic sandwich material of the blank to move therein as the inner portion of the blank is forced into the female die 14.

The blocks 52 of the counter clamp assembly 50 also have upper support surfaces 64 for supporting a blank of material while it is still relatively soft prior to stamping.

Referring now to FIGS. 6 and 7, there are illustrated different female and male dies 14' and 20', respectively, for forming a different shaped bin. Also illustrated in FIGS. 6 and 7 are blocks 52' and 40' counter clamping and clamping assemblies 50' and 34', respectively, of a clamping mechanism of the present invention. FIGS. 6 and 7 particularly show the spaces 63' between the blocks 52' and the spaces 62' between the blocks 40'.

The two different types of skins previously mentioned give different deformations to the deep-drawn material that are not part of the resulting article as illustrated in FIG. 8 and must be trimmed off such as by cutting.

Articles, such as the bin 12 of FIG. 8, made by the method and system of the present invention are not wrinkled either on their interior side or on their exterior side.

Skins that are not woven have little resistance to stretching but are not torn during molding. In other words, the method and system of the present invention do not stretch the material too much.

As illustrated in FIG. 8, the thickness of the side walls 25 of the bin 12 are relatively constant. To have a substantially constant radius at the bottom wall of the bin 12, the honeycomb core is crushed.

While the best mode for carrying out the invention has been described in detail, those familiar with the art to which this invention relates will recognize various alternative designs and embodiments for practicing the invention as defined by the following claims.

What is claimed is:

1. A method for molding thermoplastic sandwich material to form a deep-drawn article, the method comprising:

positioning a blank of thermoplastic sandwich material having a cellular core and outer skins over a female die having an article-defining cavity defined by inner surfaces of the female die;

forcing an inner portion of the blank into the female die along a substantially vertical axis and against the inner surfaces of the female die to obtain deep-drawn material;

clamping at least one outer portion of the blank immediately adjacent the female die to guide the at least one outer portion of the blank to travel into the article-defining cavity at an acute angle with respect to the vertical axis during the step of forcing so that thickness of at least one side wall of the deep-drawn material is substantially the same as thickness of the blank of thermoplastic sandwich material and so that the deep-drawn material does not significantly stretch or tear during the step of forcing;

removing the deep-drawn material from the female die; and removing any excess material from the periphery of the deep-drawn material to form the deep-drawn article wherein the step of clamping is performed with a clamping force which increases during the step of forcing and wherein the clamping force is applied on the blank outside of the cavity so that a first clamping force is initially applied on the blank to allow the inner portion of the blank to travel into the cavity and a second clamping force, larger than the first clamping force, is later applied on the blank outside the cavity at a plurality of spaced outer portions of the blank as the inner portion of the blank travels into the cavity.

2. The method as claimed in claim 1 wherein the step of forcing includes the step of stamping.

3. The method as claimed in claim 1 wherein the step of clamping is performed at a plurality of spaced outer portions of the blank immediately adjacent the female die.

4. The method as claimed in claim 3 wherein the step of clamping is performed at the plurality of spaced outer portions by a clamp assembly and a counter clamp assembly and wherein the method further comprises maintaining a substantially constant distance between the assemblies during the step of forcing.

5. The method as claimed in claim 4 wherein each of the assemblies includes a plurality of spaced elongated clamping surfaces for clamping the plurality of spaced outer portions of the blank and wherein each elongated clamping surface is inclined at the acute angle with respect to the vertical axis.

6. The method as claimed in claim 1 wherein the step of forcing is performed in a single stamping stage.

7. The method as claimed in claim 3 wherein the inner surfaces of the female die define a plurality of corners which correspond to spaces between the plurality of spaced outer portions and wherein the spaces are sized to permit excess thermoplastic sandwich material of the blank to move therein during the step of forcing.

\* \* \* \* \*